(12) United States Patent
Horikawa et al.

(10) Patent No.: US 12,237,514 B2
(45) Date of Patent: Feb. 25, 2025

(54) CURRENT COLLECTOR OF SECONDARY BATTERY AND SECONDARY BATTERY

(71) Applicant: PRIME PLANET ENERGY & SOLUTIONS, INC., Tokyo (JP)

(72) Inventors: Daisuke Horikawa, Kariya (JP); Yohei Shindo, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 484 days.

(21) Appl. No.: 17/662,134

(22) Filed: May 5, 2022

(65) Prior Publication Data
US 2022/0367879 A1 Nov. 17, 2022

(30) Foreign Application Priority Data
May 14, 2021 (JP) .................................. 2021-82564

(51) Int. Cl.
*H01M 10/0525* (2010.01)
*H01M 4/66* (2006.01)
(52) U.S. Cl.
CPC ....... *H01M 4/668* (2013.01); *H01M 10/0525* (2013.01)

(58) Field of Classification Search
CPC .. H01M 4/668; H01M 10/0525; H01M 4/624; H01M 4/66; H01M 4/667; H01M 4/70; H01M 10/052; H01M 10/4235; H01M 4/661; Y02E 60/10
See application file for complete search history.

(56) References Cited

FOREIGN PATENT DOCUMENTS

| JP | 2007-026913 A | | 2/2007 | | |
|---|---|---|---|---|---|
| JP | 2018181796 A | * | 11/2018 | ............. | Y02E 60/10 |
| KR | 20170045800 A | * | 4/2017 | .......... | H01M 10/052 |
| WO | WO-2018129836 A1 | * | 7/2018 | ........ | H01M 10/4235 |

* cited by examiner

*Primary Examiner* — Muhammad S Siddiquee
(74) *Attorney, Agent, or Firm* — Finnegan, Henderson, Farabow, Garrett and Dunner LLP (57) ABSTRACT

The present disclosure provides a current collector of a secondary battery in which the current inside the battery is easily blocked at the time of inside short circuit, and in which the capacity retention rate and the decreasing rate of the electric resistance are outstanding. The current collector herein disclosed includes a laminate structure in which a resin layer and a metal layers formed on the both surfaces of the resin layer are laminated. The surface of the metal layer includes a rough surface part provided with a plurality of protruding parts and a plurality of recessed parts. On the rough surface part, a resin coat layer is formed, and at least one part of the protruding part among the plurality of protruding parts includes an exposed part that is exposed from the resin coat layer.

9 Claims, 2 Drawing Sheets

CURRENT COLLECTOR OF SECONDARY BATTERY AND SECONDARY BATTERY

CROSS REFERENCE TO RELATED APPLICATIONS

The present application claims the priority based on Japanese Patent Application No. 2021-82564 filed on May 14, 2021, the entire contents of which are incorporated in the present specification by reference.

BACKGROUND

1. Technical Field

The present disclosure relates to a current collector used on a secondary battery; and a secondary battery that includes the current collector.

2. Description of the Background

Recently, the secondary battery, such as a lithium ion secondary battery, has been suitably used for the portable power supply, such as a personal computer and portable terminal, and for the power supply for driving automobiles, such as a battery-electric vehicle (BEV), a hybrid electric vehicle (HEV), and a plug-in hybrid electric vehicle (PHEV).

Generally, the electrode used on the secondary battery includes a current collector (for example, metal foil) and a composite material layer that is formed on the surface of the current collector. The composite material layer includes an active substance capable of storing and discharging the electric charge carrier (for example, lithium ion), and the volume change of the active substance is caused with the electric charge carrier being stored or discharged. Repeating this volume change of the active substance could facilitate peeling the current collector from the composite material layer, and thus it is desired to mitigate the load due to the volume change described above. For example, Japanese Patent Application Publication No. 2007-26913 discloses a current collector that is a laminate metal foil for lithium ion secondary battery in which a plurality of metal foils are laminated. The metal foil described above includes a roughen surface, and thus laminating to come into contact with roughen surfaces of the metal foils to each other could induce a void between the roughen surfaces. Thus, it describes that the load to the metal foil due to the volume change of the active substance can be mitigated.

SUMMARY

Anyway, in the case where the electrode of the secondary battery is contaminated with a foreign substance, an inside short circuit would be caused. When the inside short circuit is caused, the short circuit current would rise the temperature of the secondary battery. Therefore, the secondary battery is desired to include a function for more promptly blocking the current inside the battery at the time of inside short circuit, in order to suppress the temperature rise. Additionally, from the perspective of improving the capacity retention rate of the secondary battery or improving the battery performance, such as decrease in the electric resistance, it is desired to make the composite material layer be hardly peeled off from the current collector.

Then, the present disclosure has been made in view of the above-described circumstances, and has a purpose to provide a current collector of a secondary battery that easily blocks the current inside the battery at the time of inside short circuit and that has the outstanding capacity retention rate and the outstanding decreasing rate of the electric resistance. In addition, another purpose is to provide a secondary battery including the current collector described above.

In order to implement the above-described purpose, the current collector herein disclosed is a current collector used for an electrode of a secondary battery, and includes a laminate structure in which a resin layer and a metal layer formed on both surfaces of the resin layer are laminated. A surface of the metal layer includes a rough surface part that is provided with a plurality of protruding parts and a plurality of recessed parts, and a resin coat layer is formed on the rough surface part. Then, among the plurality of protruding parts, at least one part of the protruding parts includes an exposed part that is exposed from the resin coat layer.

According to the configuration described above, at the time of inside short circuit, the heat generated by the short circuit current melts the resin layer and the resin coat layer so as to increase the volume of the resin layer and the volume of the resin coat layer. This induces adding pressure on the metal layer, and thus it is possible to break the metal layer (for example, recessed part whose thickness is thin) As the result, the electric resistance drastically increases and thus it is possible to block the current inside the battery. In addition, based on the study of the present inventor and the like, it was confirmed that the resin coat layer present on the rough surface part of the metal layer made the composite material layer be hardly peeled off and that the improvement of the capacity retention rate and the decrease in the electric resistance were implemented. It is estimated that this is induced by an effect of the composite material layer having the adhesive property to the resin coat layer which is higher than the metal layer and by an effect of the protruding part exposed from the resin coat layer which increases the contact area of the composite material layer with the current collector, or the like. In addition, particularly under the low temperature condition, the resin coat layer is shrunk so as to be capable of drawing the composite material layer near the current collector, and thus it is possible to decrease the electric resistance under the low temperature condition (hereinafter, it might be referred to as "low temperature resistance").

Additionally, in one preferable aspect of the current collector herein disclosed, a rate of the protruding parts including the exposed part is equal to or more than 20 number % of the plurality of protruding parts. This can implement both of suppressing the composite material layer from being peeled off and of decreasing the electric resistance caused between the composite material layer and the metal layer.

Additionally, in one preferable aspect of the current collector herein disclosed, an average value of occupation rate of the exposed part with respect to a height direction of the protruding part in the protruding parts including the exposed part is equal to or more than 5% and not more than 99% Additionally, in one further preferable aspect, the average value of the occupation rate of the exposed part is equal to or less than 95%. This induces a favorable balance of increasing the contact area of the exposed part of the protruding part with the composite material layer and of contributing in inhibiting the composite material layer with the resin coat layer from being peeled off, and thus it is possible to implement the more outstanding capacity retention rate and implement the more outstanding decrease in the electric resistance.

Additionally, in one preferable aspect of the current collector herein disclosed, when n-number of SEM images, respectively having different points of view, of cross section of the current collector along a laminate direction of the resin layer and the metal layer (n is a natural number at least equal to or more than 4) are obtained, an average value X (μm) of thickness x of the thinnest portion and an average value Y (μm) of thickness y of the thickest portion of the metal layer respectively observed on the SEM images satisfy 0.8 μm≤X≤3 μm, and 2 μm≤Y≤11 μm. This implements improving the capacity retention rate at the particularly high level and decreasing the electric resistance (for example, low temperature resistance) at the particularly high level.

Additionally; in one preferable aspect of the current collector herein disclosed, the resin coat layer includes a conductive particle. This can further decrease the electric resistance (for example, low temperature resistance) between the composite material layer and the current collector.

Additionally, in one preferable aspect of the current collector herein disclosed, the resin layer includes a conductive particle. Additionally, in one preferable aspect, the resin layer includes an inorganic filler. This further improves the capacity retention rate and the low temperature resistance.

Additionally, as another aspect for implementing the above-described purpose, a secondary battery including a positive electrode and a negative electrode is provided. At least one among the positive electrode and the negative electrode includes the current collector herein disclosed. This makes the current inside the battery be easily blocked at the time of inside short circuit, and thus the secondary battery having the outstanding capacity retention rate and the outstanding decreasing rate of the electric resistance is implemented.

DETAILED DESCRIPTION

Below, with a current collector suitably applied to a lithium ion secondary battery being a typical example of a secondary battery as an example, the technique herein disclosed is described in details while appropriately referring to drawings. Incidentally, the matters other than matters particularly mentioned in this specification, and required for practicing the present disclosure can be grasped as design matters of those skilled in the art based on the related art in the present field. The technique herein disclosed can be executed based on the contents disclosed in the present specification, and the technical common sense in the present field. In addition, in the following accompanying drawings, the members/parts providing the same effect are given the same numerals and signs, and the overlapped explanation might be omitted or simplified. In addition, in each drawing, the dimensional relation (length, width, thickness, or the like) does not reflect the actual dimensional relation. In addition, in each drawing, the reference sign W represents "width direction" and the reference sign T represents "thickness direction". Incidentally, these directions are defined for convenience sake of explanation, and are not intended to restrict the disposed aspect of the herein disclosed secondary battery.

In addition, when the numerical value range is described with A to B (here, A and B are arbitrary numerical values) in the present specification, it means a content equal to or more than A and not more than B, and includes a range beyond A and a range below B.

Incidentally, in the present specification, the "secondary battery" is a term widely denoting an electric storage device capable of repeatedly charging and discharging, and is a concept containing storage batteries (chemical batteries), such as a lithium ion secondary battery, a sodium ion secondary battery, a nickel hydrogen battery, and containing capacitors (physical batteries), such as an electric double layer capacitor. In the present specification, the "lithium ion secondary battery" represents a battery in general that uses a lithium ion as the electric charge carrier, and that is capable of repeatedly charging and discharging with an electric charge carrier moving between the positive and negative electrodes. In the lithium ion secondary battery, the electrolyte might be, for example, a nonaqueous electrolyte, a gel state electrolyte, a solid electrolyte, or the like.

Figure 1:
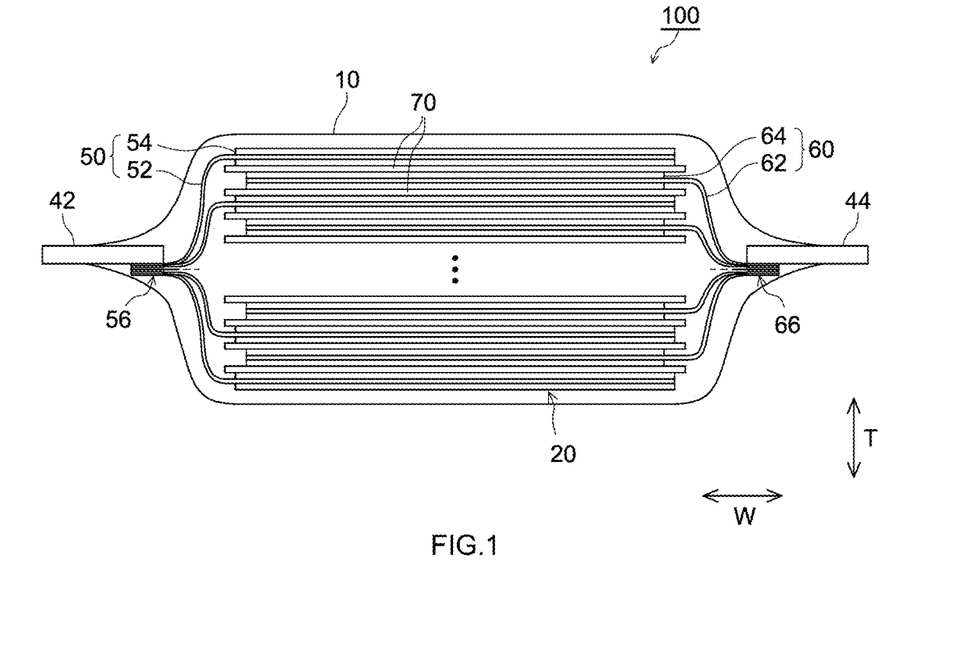
FIG. 1 is a cross sectional view that schematically shows a configuration of a lithium ion secondary battery in accordance with one embodiment.

FIG. 1 is a cross sectional view that schematically shows a configuration of a lithium ion secondary battery 100 in accordance with one embodiment. As shown in FIG. 1, the lithium ion secondary battery 100 accommodates an electrode body 20 and a nonaqueous electrolyte (not shown) inside an outer package 10. One end of a positive electrode terminal 42 is electrically connected to a positive electrode 50 inside the outer package 10, and one end of a negative electrode terminal 44 is electrically connected to a negative electrode 60 inside the outer package 10. In addition, the other end of the positive electrode terminal 42 and the other end of the negative electrode terminal 44 are exposed toward the outside of the outer package 10.

The outer package 10 is formed in a bag like shape with a laminate film. The outer package 10 includes an accommodation space that accommodates the electrode body 20 and the nonaqueous electrolyte at the inside, and the periphery of the accommodation space can be sealed with heat welding (heat sealing).

The material configuring the laminate film is not particularly restricted, and typically a configured one in which a foil shaped metal and a resin sheet are pasted can be used. For example, it is possible to use a laminate film including a three layers structure in which, on the surface of a cast polypropylene film (CPP) for the heat welding, a metal layer made of aluminum, or the like is provided for the purpose of adding the heat resistance, the seal strength, the shock resistance, or the like, and in which, further on the surface of this metal layer, an outside resin layer made of polyethylene terephthalate (PET), polyamide (PA), nylon film, or the like is provided.

In the electrode body 20, electrode sheets of the positive electrode 50 and negative electrode 60 are insulated through a separator 70 and a plurality of the resultant insulated sheets are laminated to configure the electrode body. Here, the electrode sheets of the positive electrode 50 and negative electrode 60 each includes a rectangular-shaped wide surface, and the electrode sheets are laminated to have one wide surface be opposed to the other wide surface. Incidentally, here, the laminated direction of the electrode body 20 is the thickness direction T.

The electrode sheet (positive electrode sheet) of the positive electrode 50 includes a sheet-shaped positive electrode current collector 52 that has a rectangular-shaped wide surface, and includes a positive electrode composite material layer 54 that is provided to coat the surface of the positive electrode current collector 52. On the edge part at one side in the width direction (W direction in FIG. 1) of the positive electrode current collector 52, a positive electrode current collector exposed part in which the positive electrode composite material layer 54 is not formed is provided. Respective positive electrode current collector exposed parts of the laminated positive electrode sheets are joined in a bundle shape from the above-described laminate direction (T direction in FIG. 1) so as to form a positive electrode terminal join part 56.

The electrode sheet (negative electrode sheet) of the negative electrode 60 includes a sheet-shaped negative electrode current collector 62 that has a rectangular-shaped wide surface, and includes a negative electrode composite material layer 64 that is provided to coat the surface of the negative electrode current collector 62. The edge part at one side of the negative electrode current collector 62 in the width direction (W direction in FIG. 1) is provided with a negative electrode current collector exposed part in which the negative electrode composite material layer 64 is not formed. Respective negative electrode current collector exposed parts of the laminated negative electrode sheets are joined in a bundle shape from the above-described laminate direction (T direction in FIG. 1) so as to form a negative electrode terminal join part 66.

The positive electrode terminal 42 is a sheet-shaped conductive member, one end is joined to the positive electrode terminal join part 56 inside the outer package 10, and the other end is exposed toward the outside of the outer package 10. At the portion where the positive electrode terminal 42 penetrates the outer package 10, two laminate films are stacked one on another as to sandwich the positive electrode terminal 42 from the thickness direction T, and the laminate films are welded on the surface of the positive electrode terminal 42. Incidentally, in order to improve the strength of the welding, for example, a welding film made of resin might be intervened between the positive electrode terminal 42 and the laminate film.

The negative electrode terminal 44 might be configured similarly to the above-described positive electrode terminal 42, except that the one end is joined to the negative electrode terminal join part 66.

As the positive electrode current collector 52 included by the positive electrode 50, for example, it is possible to use an aluminum foil. The positive electrode composite material layer 54 included by the positive electrode 50 includes a positive electrode active substance. As the positive electrode active substance, fir example, a lithium composite metal oxide having a layer-shaped structure, a spinel structure, or the like (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn1.5O_4$, $LiCrMnO_4$, $LiFePO_4$, or the like) can be obtained. In addition, the positive electrode composite material layer 54 might include a conductive assistant agent, a dispersing agent, a binder, or the like. As the conductive assistant agent, for example, a carbon black such as acetylene black (AB), and the other carbon materials (graphite, or the like) can be suitably used. As the dispersing agent, for example, it is possible to use polyvinyl alcohol (PVA), or the like. As the binder, for example, it is possible to use polyvinylidene fluoride (PVDF), or the like.

The positive electrode composite material layer 54 can be formed by dispersing the positive electrode active substance and a material (conductive assistant agent, hinder, or the like) used as needed into a suitable solvent (for example, N-methyl-2-pyrrolidone: NMP), by preparing the paste thrilled (or slurry formed) composition, by coating a suitable amount of this composition on the surface of the positive electrode current collector 52, and then by drying the resultant.

Figure 2:
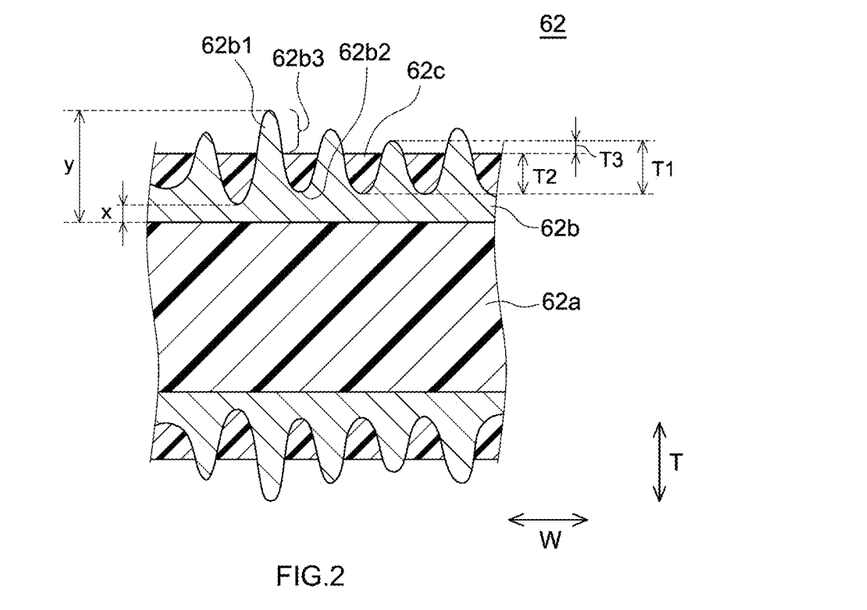
FIG. 2 is an enlarged cross sectional view that schematically shows a configuration of a negative electrode current collector in accordance with one embodiment.

FIG. 2 is a cross section enlarged view that schematically shows a configuration of the negative electrode current collector 62, The detailed configuration of the negative electrode current collector 62 will be described later.

The negative electrode composite material layer 64 is formed on the both surfaces of the negative electrode current collector 62 (see FIG. 1). The negative electrode composite material layer 64 includes a negative electrode active substance, and for example, it is possible to use a carbon material, such as graphite, hard carbon, and soft carbon, and a silicon material, such as Si and SiO, or the like. In addition, the negative electrode composite material layer 64 might further include a binder, a thickening agent, or the like. As the binder, for example, it is possible to use styrene butadiene rubber (SBR), or the like. As the thickening agent, for example, it is possible to use carboxy methyl cellulose (CMC), or the like.

The negative electrode composite material layer 64 can be formed by dispersing the negative electrode active substance and a material (binder, or the like) used as needed into a solvent (for example, ion exchange water), by preparing a paste formed (or slurry formed) composition, by coating a suitable amount of this composition on the surface of the negative electrode current collector 62, and then by drying the resultant.

As for the separator 70, it is possible to use various fine porous sheets similar to those conventionally used for the lithium ion secondary battery, for example, to obtain a fine porous resin sheet made of resin, such as polyethylene (PE) and polypropylene (PP). The fine porous resin sheet described above might be configured with a single layer structure, or might be configured with two layers or more multilayer structure (for example, a three layers structure in which PP layers are laminated on both surfaces of the PE layer). In addition, a heat resistant layer (HRL) might be provided on the surface of the separator 70.

As for the nonaqueous electrolyte, it is possible to use one similar to the conventional lithium ion secondary battery. For example, it is possible to use a nonaqueous electrolyte that a supporting salt is contained in a nonaqueous solvent. As for the nonaqueous solvent, it is possible to use an aprotic solvent, such as carbonates, esters, and ethers. Among them, it is possible to suitably apply the carbonates, for example, ethylene carbonate (EC), diethyl carbonate (DEC), dimethyl carbonate (DMC), ethyl methyl carbonate (EMC), or the like. Alternatively, it is possible to preferably use a fluorine type solvent of fluorinated carbonate, or the like, such as monofluoroethylene carbonate (MFEC), difluoroethylene carbonate (DFEC), monofuoromethyl difluoromethyl carbonate (F-DMC), and trifluoro dimethyl carbonate (TFDMC). With respect to the nonaqueous solvents as described above, one kind of them can be used alone, or 2 or more kinds of them can be combined so as to be used. As the supporting salt, for example, it is possible to suitably use a lithium salt, such as $LiPF_6$, $LiBF_4$, and $LiClO_4$. Although not restricted particularly, it is preferable that the concentration of the supporting salt is approximately equal to or more than 0.7 mol/L and not more than 1.3 mol/L.

In addition, unless the effect of the present disclosure is significantly spoiled, the nonaqueous electrolyte might include a component other than the above-described nonaqueous solvent and supporting salt, and might include various additive agents, for example, a gas generation agent, a coating film forming agent, a dispersing agent, a thickening agent, or the like. As for the additive agent described above, it is possible to particularly obtain a coating film forming agent, such as lithium bis(oxalate)borate (LiBOB), vinylene carbonate (VC), vinyl ethylene carbonate (VEC), and fluoro ethylene carbonate (FEC); an overcharge additive agent that is consisted of a chemical compound capable of generating gas at the overcharge time and that is represented by an aromatic chemical compound, such as biphenyl (BP) and cyclohexylbenzene (CHB); a surface active agent; a dispersing agent; a thickening agent, an antifreezing agent, or the like. It is possible that the concentrations of these additive agents with respect to the whole of the nonaqueous electrolyte are, for example, equal to or less than 6 mass % (typically, 0.5 mass % to 4 mass %), although they would be different based on the kinds of the additive agents.

Below, the configuration of the negative electrode current collector 62 will be described in details. As shown in FIG. 2, the negative electrode current collector 62 includes a laminate structure in which a resin layer 62a, metal layers 62b, and resin coat layers 62c are laminated. In the embodiment shown in FIG. 2, metal layers 62b are formed on the both surfaces of the resin layer 62a, and the resin coat layers 62c are formed on the surfaces of the metal layers 62b.

It is enough for the resin layer 62a to use a resin that induces the volume increase in response to the temperature rise at the time of inside short circuit, and the resin layer is configured with, for example, a thermoplastic resin. When it reaches the melting point, the state of the thermoplastic resin is changed from the solid to the liquid and thus the volume is increased. Increasing the volume of the resin layer 62a described above induces adding the pressure on the metal layers 62b, and thus it is possible to break the metal layers 62b. Breaking the metal layers 62b induces drastic increase in the electric resistance, and thus it is possible to block the current inside the battery. Thus, it is possible to suppress the temperature rise of the battery at the time of inside short circuit.

Although not restricted particularly; it is preferable for the thermoplastic resin configuring the resin layer 62a to use a thermoplastic resin whose melting point is equal to or less than 265° C. at 1 atmosphere of pressure. It is possible for those having the property described above to obtain, for example, polyethylene terephthalate (PET), polyamide (PA), polyvinyl alcohol (PVA), polyethylene (PE), polypropylene (PP), poly styrene (PS), polyvinyl chloride (PVC), thermoplastic polyester, acrylonitrile-butadiene-styrene (ABS), acrylonitrile-styrene (AS), polymethyl methacrylate (PMMA), polyvinylidene fluoride (PVDF), polyvinylidene chloride (PVDC), or the like. Furthermore, it is more preferable to use a thermoplastic resin whose melting point is equal to or less than 200° C. at 1 atmosphere of pressure, and it is preferable to use, for example, PVA, PE, PP, PVDF, or the like. Making the resin layer 62a have a lower melting point can implement blocking the current inside the battery at a lower temperature when the inside short circuit is caused on the lithium ion secondary battery 100. On the other hand, in the case where the melting point of the resin configuring the resin layer 62a is too low, there are some fears that the resin layer 62a happens to melt even at the normal use time of the lithium ion secondary battery 100. Thus, it is preferable that the melting point of the resin configuring the resin layer 62a at 1 atmosphere of pressure is equal to or more than 90° C., and for example, the melting point might be equal to or more than 100° C. Incidentally, with respect to the thermoplastic resins, one kind of them can be used alone, or 2 or more kinds of them can be used in combination. Incidentally, the melting point of the resin layer can be measured by a general differential scanning calorimetry (DSC).

The resin layer 62a can include a conductive particle. Making the resin layer 62a include the conductive particle can improve the electric conductive property of the negative electrode current collector 62, and thus the electric resistance is further decreased. As the conductive particles, it is possible to use, for example, a carbon powder, an electric conductive metal powder, or the like. As the carbon powder, it is possible to use a carbon powder, such as various carbon blacks (for example, acetylene black, furnace black, and Ketjen black), and a graphite powder. As the electric conductive metal powder, it is possible to use, for example, a copper powder, an aluminum powder, a nickel powder, or the like, and it is preferable to use an electric conductive metal powder configured with a metal, among them, the same as the metal configuring the metal layer 62b. For example, in the case where the metal layer 62b is a copper foil, it is preferable to use a copper powder as the conductive particles. Incidentally, with respect to the conductive particle, one kind of them can be used alone, or 2 or more kinds of them can be used in combination.

Although the size of the conductive particle is not restricted particularly, the average particle diameter is, for example, approximately 10 nm to 10 μm and it is preferable to be 20 nm to 5 μm. Incidentally, the wording "average particle diameter" in the present specification means an accumulation 50% particle diameter ($D_{50}$) on the particle size distribution of the volume reference obtained by the laser diffraction scattering method.

The resin layer 62a can include an inorganic filler. As the inorganic filler, for example, it is possible to use an inorganic oxide or glass that has an insulating property. Making the resin layer 62a include the inorganic filler having the insulating property can decrease the electric resistance. It is estimated that this is induced by the inorganic filler which improves the ununiforinity of the electron density capable of being generated in the metal layer 62b. As the inorganic oxide, for example, it is possible to use alumina ($Al_2O_3$), magnesia (MgO), silica ($SiO_2$), titanic ($TiO_2$), or the like. With respect to the inorganic filler, one kind of them can be used alone, or 2 or more kinds of them can be used in combination. Incidentally, although not restricted particularly, the shape of the inorganic filler might be, for example, a particle shape, a fiber shape, a sheet shape, a flake shape, or the like.

Although the average particle diameter of the inorganic filler is not restricted particularly, the average particle diameter based on the laser diffraction scattering method is, for example, 0.1 μm to 10 μm, or might be 0.5 μm to 5 μm.

The average thickness of the resin layer 62a is enough to be equal to or more than 0.1 μm, and it might be, for example, equal to or more than 10 μm. If the average thickness is as described above, the volume change occurs accompanying with the pressure that breaks the metal layer 62b when the resin layer 62a melts, and thus it is preferable. In addition, although not restricted particularly, the average thickness of the resin layer 62a is typically equal to or less than 80 μm, and might be, for example, equal to or less than 40 μm. From the perspective of the safety property at the time of inside short circuit, it is preferable that the volume change at the time of melting is larger with the thickness of the resin layer 62a being larger, but from the perspective of implementing high capacity of the battery and implementing light weighting of the battery, it is not preferable to have the thickness larger than the required one. Incidentally, the thickness of the resin layer 62a can be, for example, measured by the scanning electron microscope (SEM) observation or the like.

The metal layer 62b is a layer having the electric conductive property. The metal layer 62b can be configured with a metal foil conventionally used for the negative electrode current collector of the lithium ion secondary battery, and it is possible to use, for example, a metal foil of copper, alloy whose main component is copper, titanium, nickel, or the like. Incidentally, the alloy whose main component is copper means an alloy in which 50 wt % or more of the configuration component is copper.

The negative electrode current collector 62 shown in FIG. 2 includes a rough surface part in which a plurality of protruding parts 62b1 and a plurality of recessed parts 62b2 are provided on the surface of the metal layer 62b (surface at the side not opposed to the resin layer 62a), and the surface at the opposite side is a flat surface. A resin coat layer 62c is formed on the rough surface part, and a resin is accumulated on the recessed part 62b2. Among the plurality of protruding parts 62b1, at least one part of protruding part 62b1 includes an exposed part 62b3 that is exposed from the resin coat layer 62c.

Making the metal layer 62b include the rough surface part can provide a comparatively thin thickness portion on the metal layer 62b, and thus it becomes easy to make the metal layer 62b be broken at the thin thickness portion of the metal layer 62b as the start point at the time of inside short circuit. In addition, including the exposed part 62b3 can increase the contact area of the negative electrode composite material layer 64, formed on the surface of the negative electrode current collector 62, with the negative electrode current collector 62, and thus it becomes hard to make the negative electrode composite material layer 64 be peeled off. Furthermore, because of the exposed part 62b3, the metal layer 62b can directly come into contact with the negative electrode composite material layer 64, and thus it is possible to secure a favorable conductive path so as to decrease the electric resistance.

Although not restricted particularly, the arithmetic average roughness Ra of the rough surface part of the metal layer 62b is, for example, 0.5 to 15 μm, or might be 0.5 μm to 5 μm. The arithmetic average roughness Ra can be measured, for example, on the basis of JIS_B_0601:2001 with a probe type of surface roughness measurement device.

Although not restricted particularly, from the perspective of securing the strength of the metal layer 62b, the average value X (μm) of the thickness x (μm) of the thinnest portion of the metal layer 62b is, for example, equal to or more than 0.1 μm, preferably equal to or more than 0.5 μm, or more preferably equal to or more than 0.8 μm. In addition, the thinnest portion of the metal layer 62b becomes the broken start point at the time of inside short circuit, and thus it should be, for example, equal to or less than 5 μm, preferably equal to or less than 4 μm, or more preferably equal to or less than 3 μm.

Although not restricted particularly, the average value Y (μm) of the thickness y (μm) of the thickest portion of the metal layer 62b is, for example, equal to or more than 1 μm, and might be equal to or more than 2 μm or equal to or more than 4 μm. In addition, the average value Y described above is, for example, equal to or less than 12 μm or might be equal to or less than 11 μm.

According to the study of the present inventor and the like, it is preferable that, in the case where the average value X (μm) of the thickness x (μm) of the thinnest portion of the metal layer 62b is equal to or more than 0.8 μm and not more than 3 μm (0.8 μm≤X≤3 μm), the average value Y (μm) of the thickness y (μm) of the thickest portion of the metal layer 62b is equal to or more than 2 μm and not more than 11 μm (2 μm≤Y≤11 μm) and X<Y. This makes the negative electrode composite material layer 64 be further hardly peeled off and implements the favorable capacity retention rate and the favorable decreasing rate of the electric resistance.

The thickness x (μm) of the thinnest portion and the thickness y (μm) of the thickest portion of the metal layer 62b can be measured on the basis of the cross section SEM images of the metal layer 62b along the laminate direction of the resin layer 62a and metal layer 62b (T direction in FIG. 2). With a predetermined magnification (for example, magnification: 4000 times), n-number of the above-described cross section SEM images, respectively having different points of view, are obtained (n is a natural number at least equal to or more than 4, for example, equal to or more than 10). Then, on each SEM image, the thickness x (μm) of the thinnest portion and the thickness y (μm) of the thickest portion of the metal layer 62b are measured so as to be able to obtain the average value X (μm) of the above-described x and the average value Y (μm) of the above-described y. Incidentally, as shown in FIG. 2, the thickness x of the above-described thinnest portion typically exists at the position of the recessed part, and the thickness y of the above-described the thickest portion typically exists at the position of the protruding part. Incidentally, on each point of view, in the case where the thickness y of the thickest portion of the metal foil exceeds the range of the view point, it is allowed to appropriately adjust the magnification in order to measure the thickness y.

In addition, on the metal layer 62b, although the distance between the adjacent protruding parts 62b1 is not restricted particularly, it is preferable that the distance is equal to or less than 1 μm. This increases the number of the protruding parts 62b1, so as to increase the surface area of the metal layer 62b. As this result, the contact area of the metal layer 62b with the negative electrode composite material layer 64 is increased, the negative electrode composite material layer 64 becomes hard to be peeled off, and thus the capacity retention rate is improved. Incidentally, the wording "distance between the protruding parts 62b1" means a distance between the respective highest portions of adjacent protruding parts 62b1 on the cross section SEM image along the laminate direction (thickness direction T) of the resin layer 62a and metal layer 62b.

The rough surface part of the metal layer 62b can be formed by a well known roughen processing method, and it is possible to use, for example, laser irradiation, etching, sputtering, ion plating, PLD (Pulsed Laser Deposition), or the like. Among them, it is preferable to form by using the etching processing with a drug solution. If the etching processing is used, it is possible to make the firmed distance between the protruding parts 62b1 be shorter, and for example, it is possible to be equal to or less than 1 μm.

The resin coat layer 62c is formed on the rough surface part of the metal layer 62b. More particularly, the resin coat layer 62c is mainly formed within the recessed part 62b2, and covers at least one part of the protruding part 62b1. In addition, some among a plurality of protruding parts 62b1 might have the whole portion of the protruding part 62b1 be covered with the resin coat layer 62c (in other words, a protruding part 62b1 not including the exposed part 62b3 might exist). The resin coat layer 62c has a function as a binder that firmly adheres the negative electrode composite material layer 64 with the negative electrode current collector 62, and it is possible to further inhibit the negative electrode composite material layer 64 from being peeled off. Particularly, under the low temperature condition, the resin coat layer 62c is shrunk to closely bond the negative electrode composite material layer 64 to the negative electrode current collector 62, so as to be able to further decrease the electric resistance. In addition, the resin coat layer 62c melts in response to the temperature rise at the time of inside short circuit, and thus it is possible to apply the pressure on the recessed part 62b2 of the metal layer 62b. Thus, at the time of inside short circuit, the metal layer 62b suffers pressure from the both sides of the resin layer 62a and resin coat layer 62c, and therefore it is possible to surely break the metal layer 62b.

The kinds of resin configuring the resin coat layer 62c might be the same as the illustrations of the resin capable of configuring the resin layer 62a. Among them, as the suitable example, it is possible to obtain a resin conventionally used as the binder of the composite material layer, and it is possible to suitably use, for example, PVDF. Thus, it is possible to suitably inhibit the negative electrode composite material layer 64 from being peeled off.

Although the resin coat layer 62c and the resin layer 62a might be configured with the same resin or might be configured with the different resin, it is preferable that the difference between the melting point of the resin configuring the resin layer 62a and the melting point of the resin configuring the resin coat layer 62c is smaller. For example, it is preferable that the difference of melting points described above is equal to or less than 100° C., and more preferable that it is equal to or less than 50° C. Thus, the timing of melting the resin layer 62a and the timing of melting the resin coat layer 62c at the time of inside short circuit become closer to each other, so as to facilitate making the metal layer 62b be broken.

It is preferable from the perspective of improving the electric conductive property between the negative electrode composite material layer 64 and the metal layer 62b, that the resin coat layer 62c includes a conductive particle. As for the conductive particle, it is possible to use the above-described one capable of being used for the resin layer 62a.

From the perspective of increasing the contact area of the metal layer 62b with the negative electrode composite material layer 64, it is preferable that the existence rate of the protruding parts 62b1 each including the exposed part 62b3 is higher. For example, the rate of the protruding parts 62b1 each including the exposed part 62b3 with respect to the number of the whole of the plurality of protruding parts 62b1 is preferably equal to or more than 20 number %, more preferably equal to or more than 30 number %, further preferably equal to or more than 50 number %, and moreover preferably equal to or more than 80 number %, or might be, for example, 100 number %.

The protruding part 62b1 including the exposed part 62b3 includes the exposed part 62b3 and a portion covered by the resin coat layer 62c, and then the contact area of the metal layer 62b with the negative electrode composite material layer 64 becomes too small in the case where the occupation rate of the exposed part 62b3 is too low. Thus, it is possible that the negative electrode composite material layer 64 becomes to be easily peeled off and the electric resistance is increased. Therefore, in the height direction of the protruding part 62b1 (thickness direction T in FIG. 2), the average value of the occupation rate of the height T3 of the exposed part 62b3 with respect to the height T1 of the protruding part 62b1 (in other words, the difference between the height T1 of the protruding part 62b1 and the thickness T2 of the resin coat layer 62c) is, for example, preferably equal to or more than 5%, might be more preferably equal to or more than 10%, or for example, might be equal to or more than 30%. On the other hand, in the case where the occupation rate of the exposed part 62b3 is too high, the thickness of the formed resin coat layer 62c becomes insufficient and thus the effect of the resin coat layer 62c becomes insufficient. Therefore, the average value of the occupation rate of the height T3 of the exposed part 62b3 with respect to the height T1 of the protruding part 62b1 is, for example, preferably equal to or less than 99%, is more preferably equal to or less than 95%, or might be equal to or less than 90%. Incidentally, the occupation rate of the exposed part 62b3 can be measured on the basis of cross section SEM images along the laminate direction of the resin layer 62a and metal layer 62b. In addition, at that time, in-number of protruding parts 62b1 each including the exposed part 62b3 are selected at random (m is a natural number equal to or more than 5), and the average value of the occupation rates of the exposed parts 62b3 of the selected protruding parts 62b1 is obtained.

The measurement methods for the height T1 of the protruding part 62b1, the thickness T2 of the resin coat layer 62c, and the height T3 of the exposed part 62b3 might be similar to the above-described measurement method for the thickness of the metal layer 62b, and the measurements can be performed on the basis of the cross section SEM images along the laminate direction of the resin layer 62a and metal layer 62b. Incidentally, the height T1 of the protruding part 62b1 can be obtained by obtaining an intersection point with a line that connects the lowest points (portions whose heights are the lowest) one another of the recessed parts 62b2 adjacently arranged at the left and right sides of the protruding part 62b1 and with a line drawn from the apex of the protruding part 62b1 (the highest point) toward the laminate direction on the above-described cross section SEM image, and by measuring the distance between the apex of the protruding part 62b1 and the intersection point.

Regarding the negative electrode current collector 62, it is preferable that the rough surface part of the metal layer 62b and the resin coat layer 62c are provided on the whole of the region on which the negative electrode composite material layer 64 is formed. This can make the whole of the negative electrode composite material layer 64 be hardly peeled off from the negative electrode current collector 62. In addition, the breakage of the metal layer 62b can be induced promptly if the inside short circuit is caused at any position of the negative electrode composite material layer 64, and thus the higher safety property can be implemented.

It is preferable that either of the resin layer 62a and resin coat layer 62c is not formed on the negative electrode terminal join part 66. This can make the negative electrode terminal join part 66 directly join the metal layers 62b one another of the plurality of negative electrode sheets, and thus it is possible to make the negative electrode terminal join part 66 have the outstanding electric conductive property and the outstanding join strength.

While the configuration of the current collector herein disclosed (negative electrode current collector 62) is explained above, the configuration of the current collector herein disclosed is not restricted to the above explanation. Below, a modified example is shown in FIG. 3 and explained.

Modified Example

Figure 3:
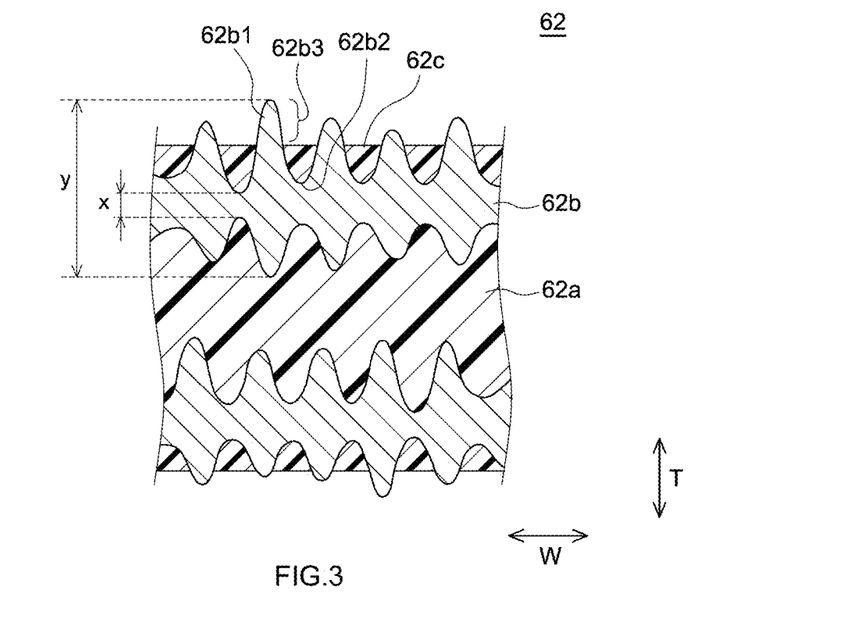
FIG. 3 is an enlarged cross sectional view that schematically shows a configuration of the negative electrode current collector in accordance with a modified example.

FIG. 3 is an enlarged cross sectional view schematically shows a configuration of the modified example of the negative electrode current collector 62. In this modified example, the rough surface part is provided even on the interface of the metal layer 62b and resin layer 62a. This can increase the contact area of the resin layer 62a with the metal layer 62b, and thus it is possible to make the metal layer 62b be adhered more firmly to the resin layer 62a. Incidentally, in the modified example, as the thickness y (μm) at the thickest portion of the metal layer 62b, the thickness including the protruding parts existing on the surfaces at the both sides of the metal layer 62b is measured as shown in FIG. 3.

The lithium ion secondary battery 100 can be used for various purposes. For example, it is possible to suitably use it as a high output power source for a motor mounted on a vehicle (power supply for drive). Although the kinds of the vehicle is not restricted particularly, the vehicle is typically an automobile, for example, plug-in hybrid electric vehicle (PHEV), hybrid electric vehicle (HEY), battery electric vehicle (BEV), or the like. The lithium ion secondary battery 100 can be used in a battery pack form in which a plurality of batteries are electrically connected.

While the configuration of the current collector herein disclosed is explained above with using the negative electrode current collector 62 as an example, the current collector herein disclosed can be used as the positive electrode current collector 52, too. In this case, it is enough to change the metal foil configuring the metal layer 62b to a metal foil (for example, aluminum foil) used for the positive electrode, and the other configurations might be similar.

In addition, while the details of the laminate type non-aqueous electrolyte lithium ion secondary battery including the laminate electrode body has been explained as one example, these explanations are merely illustrations and do not restrict the scope of claims. The technology according to the appended claims includes various modifications and changes of the embodiments described up to this point. For example, instead of the laminate electrode body, a wound electrode body might be provided in which a positive electrode sheet and a negative electrode sheet are wound via a separator sheet. In addition, instead of the outer package 10, a battery case might be used that is configured with a metal material, such as aluminum. In addition, it might be an all-solid battery using a solid electrolyte as the electrolyte, or might be a polymer battery using a polymer electrolyte as the electrolyte.

Although test examples related to the technique herein disclosed are explained below, it is not intended that the technique herein disclosed is restricted to the test examples.

Test Example 1

Preparation of Negative Electrode Current Collector

In the test example 1, 11 kinds of negative electrode current collectors were manufactured as examples 1 to 11, and then their performances for the lithium ion secondary battery were evaluated. At first, a copper foil and a resin sheet (thickness: 10 μm) made of polyethylene (PE) were prepared. In the example 1 and example 2, copper foils having no rough surface part were used as the negative electrode current collectors. In the examples 3 to 11, copper foils each having rough surface parts on the both surfaces were pasted on the both surfaces of the resin sheet, and were subjected to the hot press at 100° C. to 250° C. for 1 minute to 30 minutes, so as to weld the copper foils on the resin sheet. Next, the copper foil welded on the manufactured resin sheet described above was soaked in a mix liquid in which a conductive particle, PVDF, and N-methyl-2-pyrrolidone (NMP) were mixed, so as to perform the dip-coating on the copper foil surface. Then, this copper foil was dried, so as to form the resin coat layer on the surface of the copper foil. Then, this resin coat layer was scraped with a brush at the speed of 200 rpm to adjust the thickness of the resin coat layer, so as to manufacture the negative electrode current collector of each example. Incidentally, in the example with the resin coat layer including the conductive particle, acetylene black (AB) or copper (Cu) particles was used as the conductive particle. The kind of the conductive particle used in each example is shown in Table 1. Additionally, in the examples 7 to 9, a resin sheet including at least one among AB as the conductive particle and alumina ($Al_2O_3$) powder as the inorganic filler was used. The kind of the inorganic filler used in each example is shown in Table 1.

Manufacture of Negative Electrode Sheet

A powder of silicon oxide and a graphite were mixed at the weight ratio of 80:20, and the resultant was prepared as the negative electrode active substance. In addition, styrene butadiene rubber (SBR) was prepared as the binder, and carboxy methyl cellulose (CMC) was prepared as the thickening agent. Then, weighing was performed to have the weight ratio be negative electrode active substance:SBR:CMC=90:5:5, ion exchange water being the dispersion medium was added to have the solid content rate be 66 mass %, and the resultant was mixed with a planetary mixer. As described above, the paste for forming the negative electrode composite material layer was prepared.

Next, a die coater was used to add the paste for forming the negative electrode composite material layer in a strip-like shape so as to coat the copper foil surfaces at the both surfaces of the negative electrode current collector of each example prepared as described above, and then the resultant was dried. Incidentally, this operation was performed on the both surfaces of the negative electrode current collector of each example. Then, the press processing was performed on this negative electrode current collector so as to manufacture the negative electrode sheet.

Manufacture of Lithium Ion Secondary Battery for Evaluation

A powder of $LiNi_{1/3}Co_{1/3}Mn_{1/3}O_2$ (NCM) was prepared as the positive electrode active substance, acetylene black (AB) was prepared as the conductive assistant agent, polyvinylidene fluoride (PVDF) was prepared as the binder, and polyvinyl alcohol (PVA) was prepared as the dispersing agent. For them, weighing was performed to have the weight ratio be NCM:AB:PVDF:PVA=90:8:1.8:0.2, NMP being the dispersion medium was added to have the solid content be 56 mass %, and then the resultant was mixed with the planetary mixer. As described above, the paste for forming the positive electrode composite material layer was prepared.

Next, a die coater was used to add the paste for forming the positive electrode composite material layer in a strip-like shape so as to coat the both surfaces of the aluminum foil, and then the resultant was dried. Then, the press processing was performed on the aluminum foil including the dried paste for forming the positive electrode composite material layer so as to manufacture the positive electrode sheet.

In addition, as for the separator sheet, a porous polyolefin sheet was prepared that included a three layers structure of PP/PE/PP.

the manufactured positive electrode sheet and negative electrode sheet were opposed to each other through the separator sheet to be laminated, so as to manufacture the laminate type electrode body. An terminal was attached to the laminate type electrode body, and then the laminate type electrode body was accommodated in the aluminum laminate bag. Then, the laminate electrode body is impregnated with the nonaqueous electrolyte and then the opening of the aluminum laminate bag was encapsulated and sealed so as to manufacture the lithium ion secondary battery for evaluation. As for the nonaqueous electrolyte, the ethylene carbonate (EC) and ethyl methyl carbonate (EMC) were mixed at the volume ratio of 1:3, further vinylene carbonate (VC) at 2 mass % was added to the mixture, $LiPF_6$ as the supporting salt at the concentration of 1.0 mol/L was dissolved into the mix solvent, and then the resultant was used.

Analysis of Cross Section of Negative Electrode Sheet=

The cross sections of the manufactured negative electrode current collectors of examples 3 to 11 in the laminate direction of the resin layer of the negative electrode current collector and the copper foil was observed at 4000 times of magnification with SEM, and cross section SEM images for 4 positions with different points of view were obtained. On each of the obtained cross section SEM images, the minimum thickness x and maximum thickness y of the copper foil were measured. Incidentally, since each example included the copper foils on the both surfaces of the resin layer, on each point of view, the minimum thickness x and maximum thickness y of each copper foil were measured. Then, values of the minimum thickness x and maximum thickness y respectively obtained from the cross section SEM images at the above-described 4 positions with different points of view were used to obtain the average value X (μm) of the minimum thickness and the average value Y (μm) of the maximum thickness of the copper foil of each example. These values are respectively shown as "average minimum thickness X (μm)" and "average maximum thickness Y (μm)" in Table 1. Incidentally, regarding the example 1 and the example 2, the measured value of the thickness of the copper foil is shown.

In addition, the number of protruding parts existing on the surface at the side of the copper foil where the resin coat layer was formed from each point of view were counted, and among them, the number of protruding parts, in which the protruding part height equal to or more than 5% was exposed from the resin coat layer, was measured. Then, the rate of the number of the protruding parts exposed from the resin coat layer described above is shown in Table 1 as "rate of protruding parts including exposed part (number %)".

Activation Processing and Initial Capacity Measurement

Each of the above-described manufactured lithium ion secondary batteries for evaluation was disposed under a 25° C. environment. Each lithium ion secondary battery for evaluation was subjected to the constant current charging with ⅓ C current value until it reached 4.2 V. and then subjected to the constant voltage charging until the current value became 1/50 C, so as to reach the full charging state. After that, each lithium ion secondary battery for evaluation was subjected to the constant current electric discharging with ⅓ C current value until it reached 3.0 V. The electric discharging capacity at that time was treated as the initial capacity. Incidentally, the wording "1 C" means a current size that can implement charging of SOC (state of charge) from 0% to 100% for 1 hour.

Measurement of Low Temperature Resistance

Each of the above-described activated lithium ion secondary batteries for evaluation was adjusted to have 3.70 V release voltage, and was disposed under a −5° C. temperature environment. Under the environment described above, the electric discharging with 3 C current value for 25 seconds was performed, and then the voltage change amount ΔV at that time was obtained. In addition, the current value to be 20 C was obtained. Then, the calculated value of (ΔV/20 C current value) was obtained as the low temperature resistance. The ratio of the low temperature resistance of the lithium ion secondary battery for evaluation of each example in the case where the low temperature resistance of the lithium ion secondary battery for evaluation of the example 1 is set to be 1.00 is shown as the standardization low temperature resistance in Table 1.

Measurement of Capacity Retention Rate

Each of the activated lithium ion secondary batteries for evaluation was adjusted to have the release voltage be 3.3 V, and was disposed under the 25° C. environment. A constant current system was applied for the electric charging and discharging, the charging was performed with 1 C current value until it reached 4.2 V, and then the electric discharging was performed with 1 C current value until it reached 3.3 V. This electric charging and discharging was treated as 1 cycle, and then 500 cycles were performed repeatedly. Then, the capacity after 500 cycles was measured by the method similar to the above-described initial capacity. Then, a value of (capacity after 500 cycles/initial capacity)×100 was calculated, so as to obtain the capacity retention rate (%). The results are shown in Table 1.

Safety Property Test

After each of the activated lithium ion secondary batteries for evaluation was subjected to the constant current charging with ⅓ C current value until it reached 4.2 V, the constant voltage charging was performed until the current value reached 1/10 C, so as to reach the full charging state. After that, each lithium ion secondary battery for evaluation at the full charging state was disposed under 25° C. environment. Next, a steel nail whose diameter was 3 mm was made to penetrate a portion near the center of each lithium ion secondary battery for evaluation at 10 mm/sec speed. The outer surface temperature of each lithium ion secondary battery for evaluation at that time was measured with a thermocouple, so as to measure the highest temperature. Then, the results are shown in Table 1, as "Excellent" is applied in the case where the highest temperature at that time was less than 150° C., "Good" was applied in the case where the highest temperature at that time was equal to or more than 150° C. and not more than 200° C., and "NG" is applied in the case where the highest temperature at that time was equal to or more than 200° C.

TABLE 1

| Sample | Metal layer Kind | Metal layer Average minimum thickness X (μm) | Metal layer Average maximum thickness Y (μm) | Rate of protruding part including exposed part (number %) | Resin coat layer Kind | Resin coat layer Conductive particle | Resin layer Kind | Resin layer Conductive particle | Resin layer Inorganic filler | Evaluation test Safety property test | Evaluation test Capacity retention rate (%) | Evaluation test Standardization low temperature resistance |
|---|---|---|---|---|---|---|---|---|---|---|---|---|
| Example 1 | Cu | 11 | 11 | — | No | No | No | No | No | NG | 40.1 | 1.00 |
| Example 2 | Cu | 22 | 22 | — | No | No | No | No | No | NG | 40.1 | 0.98 |
| Example 3 | Cu | 3 | 11 | 30 | PVDF | No | PE | No | No | Good | 48.3 | 0.95 |
| Example 4 | Cu | 3 | 11 | 20 | PVDF | AB | PE | No | No | Excellent | 61.2 | 0.81 |
| Example 5 | Cu | 3 | 11 | 30 | PVDF | AB | PE | No | No | Excellent | 71.2 | 0.73 |
| Example 6 | Cu | 3 | 11 | 30 | PVDF | Cu | PE | No | No | Excellent | 70.9 | 0.71 |
| Example 7 | Cu | 3 | 11 | 30 | PVDF | Cu | PE | AB | No | Excellent | 75.2 | 0.66 |
| Example 8 | Cu | 3 | 11 | 30 | PVDF | Cu | PE | No | Al$_2$O$_3$ | Excellent | 74.6 | 0.69 |
| Example 9 | Cu | 3 | 11 | 30 | PVDF | Cu | PE | AB | Al$_2$O$_3$ | Excellent | 74.7 | 0.63 |
| Example 10 | Cu | 3 | 11 | 50 | PVDF | AB | PE | No | No | Excellent | 71.1 | 0.72 |
| Example 11 | Cu | 3 | 11 | 80 | PVDF | AB | PE | No | No | Excellent | 72.1 | 0.74 |

As shown in Table 1, compared with the example 1 and the example 2 in which a metal foil not including the rough surface part was used as the current collector, the examples 3 to 11 had more favorable results of the safety property test, and improved the capacity retention rate, too. Further, in addition to this, the examples 3 to 11 had the low temperature resistance that was lower than the example 1. This shows that, when the current collector including the resin layer, the metal foil having the rough surface part, and the resin coat layer is used, not only the outstanding safety property is provided but also the improvement of the battery performance is implemented, such as the improvement of the capacity retention rate and the decrease in the low temperature resistance.

In addition, compared between the examples 3 to 11, it can be understood that, in the case where the resin coat layer includes the conductive particle, more outstanding capacity maintenance rate and more outstanding decrease in the low temperature resistance are implemented. In addition, it can be understood that the resin coat layer including the conductive particle makes the results of the safety property test be more favorable.

In addition, compared between the examples 4, 5, 10, and 11, it can be understood that, in the case where the rate of the protruding part exposed from the resin coat layer is equal to or more than 30 number %, the improvement of the capacity retention rate and the decrease in the low temperature resistance are implemented at the higher level.

Furthermore, compared between the examples 6 to 9, it can be understood that, in the case where the resin layer includes the conductive particle and/or the inorganic filler, the improvement of the capacity retention rate and the decrease in the low temperature resistance are implemented at the particularly higher level.

Test Example 2

Regarding the test example 2, discussion was performed about the thickness of the resin coat layer. Particularly, attention was paid to the protruding part that includes the exposed part exposed from the resin coat layer, and the occupation rate of the exposed part on the protruding part was studied. Here, 8 kinds of negative electrode current collectors, examples 12 to 19, were manufactured and were subjected to the test. After manufactured similarly to the example 5 in the above-described test example 1, these negative electrode current collectors were subjected to the adjustment on the scraped rate of the resin coat layer of each example with a brush, so as to manufacture the resin coat layers having various thicknesses. Then, the lithium ion secondary battery for evaluation was manufactured similarly to the test example 1, and the various evaluation tests were performed similarly to the test example 1. Incidentally, in the test example 2, for analyzing the cross section of the negative electrode sheet, 4 protruding parts each including the exposed part were selected at random for each point of view (in other words, total 16 for each example), and the occupation rate of the exposed part with respect to the whole height of the protruding part in the height direction of the protruding part (laminate direction of the resin sheet and copper foil) was calculated. This result is shown in Table 2. In addition, although not shown in the table, the number of the protruding parts including the exposed part in the negative electrode current collector of any of the examples 12 to 19 was about 30 number %.

TABLE 2

| | | Metal layer | | Rate of exposed part of protruding part (%) | Resin coat layer | | Resin layer | | | Evaluation test | | |
| | | Average minimum thickness X (μm) | Average maximum thickness Y (μm) | | Kind | Conductive particle | Kind | Conductive particle | Inorganic filler | Safety property test | Capacity retention rate (%) | Standardization low temperature resistance |
|---|---|---|---|---|---|---|---|---|---|---|---|---|
| Sample | Kind | | | | | | | | | | | |
| Example 12 | Cu | 3 | 11 | 99 | PVDF | AB | PE | No | No | Good | 50.1 | 0.91 |
| Example 13 | Cu | 3 | 11 | 97 | PVDF | AB | PE | No | No | Good | 49.1 | 0.89 |
| Example 14 | Cu | 3 | 11 | 95 | PVDF | AB | PE | No | No | Excellent | 70.7 | 0.74 |
| Example 15 | Cu | 3 | 11 | 90 | PVDF | AB | PE | No | No | Excellent | 71.1 | 0.69 |
| Example 16 | Cu | 3 | 11 | 70 | PVDF | AB | PE | No | No | Excellent | 71.9 | 0.72 |
| Example 17 | Cu | 3 | 11 | 50 | PVDF | AB | PE | No | No | Excellent | 71.7 | 0.73 |
| Example 18 | Cu | 3 | 11 | 30 | PVDF | AB | PE | No | No | Excellent | 71.3 | 0.75 |
| Example 19 | Cu | 3 | 11 | 10 | PVDF | AB | PE | No | No | Excellent | 71.2 | 0.74 |

As shown in Table 2, it can be understood that, in the case where the rate of the exposed part in the height direction of the protruding part is equal to or less than 99%, the high safety property is implemented and the lithium ion secondary battery having the outstanding capacity retention rate and the outstanding low temperature resistance is implemented. Particularly, it can be understood that, in the case where the rate of the exposed part in the height direction of the protruding part is equal to or less than 95%, the safety property at the higher level, the more outstanding capacity retention rate, and the more outstanding low temperature resistance are implemented.

Test Example 3

In the test example 3, the study was performed about the ranges of the average minimum thickness X and average maximum thickness Y of the used copper foil. Particularly, the etching processing was performed on the used copper foil, a plurality of copper foils in which the extents of the rough surface parts were different were prepared, and these were used to manufacture the negative electrode current collectors of examples 20 to 26. As the configuration other than the copper foil was similar to the above-described example 5, the lithium ion secondary battery for evaluation for each example was manufactured. Then, various evaluation tests were performed similarly to the above-described test example 1. The results are shown in Table 3.

As shown in Table 3, any of the example 5 and the examples 20 to 26 implemented the outstanding safety property and had the outstanding capacity retention rate and the outstanding low temperature resistance. Among them, the example 5 and the examples 24 to 26 implemented the particularly outstanding capacity retention rate and the particularly outstanding low temperature resistance. Based on this, it can be understood that the average minimum thickness X of the metal layer being equal to or more than 0.8 μm and not more than 3 μm and the average maximum thickness Y of the metal layer being equal to or more than 2 μm and not more than 11 μm are suitable.

What is claimed is:

1. A current collector used for an electrode of a secondary battery, comprising:
   a laminate structure in which a resin layer and a metal layer formed on both surfaces of the resin layer are laminated, wherein
   a surface of the metal layer comprises a rough surface part that is provided with a plurality of protruding parts and a plurality of recessed parts,
   on the rough surface part, a resin coat layer is formed, and
   among the plurality of protruding parts, at least one part of the protruding parts comprises an exposed part that is exposed from the resin coat layer.

TABLE 3

| | | Metal layer | | Rate of protruding part including exposed part (number %) | Resin coat layer | | Resin layer | | | Evaluation test | | |
| | | Average minimum thickness X (μm) | Average maximum thickness Y (μm) | | Kind | Conductive particle | Kind | Conductive particle | Inorganic filler | Safety property rest | Capacity retention rate (%) | Standardization low temperature resistance |
|---|---|---|---|---|---|---|---|---|---|---|---|---|
| Sample | Kind | | | | | | | | | | | |
| Example 20 | Cu | 0.5 | 1 | 30 | PVDF | AB | PE | No | No | Excellent | 62.3 | 0.81 |
| Example 21 | Cu | 0.5 | 12 | 30 | PVDF | AB | PE | No | No | Excellent | 62.1 | 0.79 |
| Example 22 | Cu | 4 | 1 | 30 | PVDF | AB | PE | No | No | Excellent | 62.1 | 0.8 |
| Example 23 | Cu | 4 | 12 | 30 | PVDF | AB | PE | No | No | Excellent | 63.1 | 0.78 |
| Example 24 | Cu | 0.8 | 2 | 30 | PVDF | AB | PE | No | No | Excellent | 70.1 | 0.74 |
| Example 25 | Cu | 0.8 | 11 | 30 | PVDF | AB | PE | No | No | Excellent | 71.7 | 0.73 |
| Example 26 | Cu | 3 | 4 | 30 | PVDF | AB | PE | No | No | Excellent | 71.3 | 0.71 |
| Example 5 | Cu | 3 | 11 | 30 | PVDF | AB | PE | No | No | Excellent | 71.2 | 0.73 |

2. The current collector according to claim 1, wherein a rate of the protruding part comprising the exposed part is equal to or more than 20 number % of the plurality of protruding parts.

3. The current collector according to claim 1, wherein in the protruding parts comprising the exposed part, an average value of occupation rate of the exposed part with respect to a height direction of the protruding part is equal to or more than 5% and not more than 99%.

4. The current collector according to claim 3, wherein the average value of the occupation rate of the exposed part is equal to or less than 95%.

5. The current collector according to claim 1, wherein when n-number of SEM images, respectively having different points of view, of cross section of the current collector along a laminate direction of the resin layer and the metal layer (n is a natural number equal to or more than 4) are obtained, an average value $X$ (μm) of thickness x of the thinnest portion and an average value $Y$ (μm) of thickness y of the thickest portion of the metal layer respectively observed on the SEM images satisfy:
0.8 μm≤X≤3 μm, and 2 μm≤Y≤11 μm.

6. The current collector according to claim 1, wherein the resin coat layer comprises a conductive particle.

7. The current collector according to claim 1, wherein the resin layer comprises a conductive particle.

8. The current collector according to claim 1, wherein the resin layer comprises an inorganic filler.

9. A secondary battery, comprising:
a positive electrode and a negative electrode, wherein at least one among the positive electrode and the negative electrode comprises the current collector according to claim 1.

* * * * *